United States Patent
Cummings

(10) Patent No.: US 7,983,295 B2
(45) Date of Patent: Jul. 19, 2011

(54) OPTIMIZING PACKET QUEUES FOR CHANNEL BONDING OVER A PLURALITY OF DOWNSTREAM CHANNELS OF A COMMUNICATIONS MANAGEMENT SYSTEM

(75) Inventor: Scott A. Cummings, Suwanee, GA (US)

(73) Assignee: Broadcom Corporation, Irvine, CA (US)

( * ) Notice: Subject to any disclaimer, the term of this patent is extended or adjusted under 35 U.S.C. 154(b) by 1327 days.

(21) Appl. No.: 11/260,279

(22) Filed: Oct. 28, 2005

(65) Prior Publication Data
US 2007/0097907 A1  May 3, 2007

(51) Int. Cl.
*H04J 3/16* (2006.01)

(52) U.S. Cl. .................... 370/465; 370/412

(58) Field of Classification Search ............ 370/252, 370/431, 486, 461, 395, 229, 329, 412, 504; 455/560, 522; 375/299
See application file for complete search history.

(56) References Cited

U.S. PATENT DOCUMENTS

| | | | | |
|---|---|---|---|---|
| 6,259,698 B1 * | 7/2001 | Shin et al. | ........... | 370/395.7 |
| 7,113,484 B1 * | 9/2006 | Chapman et al. | ........... | 370/252 |
| 7,133,423 B1 * | 11/2006 | Chow et al. | ........... | 370/504 |
| 7,567,625 B2 * | 7/2009 | Oh et al. | ........... | 375/299 |
| 2001/0046878 A1 * | 11/2001 | Chang | ........... | 455/522 |
| 2003/0043828 A1 * | 3/2003 | Wang et al. | ........... | 370/412 |
| 2004/0097267 A1 * | 5/2004 | Pecen et al. | ........... | 455/560 |
| 2005/0232193 A1 * | 10/2005 | Jorgensen | ........... | 370/329 |
| 2005/0232304 A1 * | 10/2005 | Quigley | ........... | 370/486 |
| 2005/0265376 A1 * | 12/2005 | Chapman et al. | ........... | 370/461 |
| 2006/0002294 A1 * | 1/2006 | Chapman et al. | ........... | 370/229 |
| 2006/0039380 A1 * | 2/2006 | Cloonan et al. | ........... | 370/395.4 |

* cited by examiner

*Primary Examiner* — Kwang B Yao
*Assistant Examiner* — Syed M Bokhari
(74) *Attorney, Agent, or Firm* — Sterne, Kessler, Goldstein & Fox, P.L.L.C.

(57) ABSTRACT

A plurality of downstream channels enables communications between a CMTS and a plurality of legacy and non-legacy cable modems. A dispersion mechanism optimizes channel bonding, such that the downstream channels are interoperable with DOCSIS™-compliant, legacy cable modems. A program identifier field distinguishes between bonded and non-bonded flows. For bonded flows, a bonding group is defined to bond a set of downstream channels. The packets for each bonding group are classified into channel queues at or near a MPEG level or a packet level. To mitigate congestion and multiplexing inefficiencies, the dispersion mechanism collects real-time information to determine which channel receives the bonded packets. The dispersion mechanism includes a queue manager and a priority manager. The queue manager dynamically creates queues and allocates queue memory. The priority manager spools the appropriate bytes to an MPEG encapsulation engine for the appropriate outgoing modulator.

13 Claims, 3 Drawing Sheets

OPTIMIZING PACKET QUEUES FOR CHANNEL BONDING OVER A PLURALITY OF DOWNSTREAM CHANNELS OF A COMMUNICATIONS MANAGEMENT SYSTEM

BACKGROUND OF THE INVENTION

1. Field of the Invention

The present invention relates generally to communications networking, and more specifically, to managing the transmission of traffic across a communications network.

2. Related Art

Conventional cable communications systems deploy a cable modem headend (e.g., cable modem termination system (CMTS) for a headend controller) that manages communications with a plurality of cable modems. The headend defines the upstream and downstream operating characteristics that enable the cable modems to send carrier signals upstream to the headend and receive signals from the headend in the downstream. The upstream and downstream may consist of multiple channels that can be assigned to the cable modems.

SUMMARY OF THE INVENTION

In a communications system (such as cable modem communications), a plurality of downstream channels enables downstream communications between a supervisory communications node (e.g., a CMTS) and a plurality of remote communications nodes (e.g., cable modems) that include both legacy and non-legacy devices. A dispersion mechanism optimizes the implementation of channel bonding over the downstream channels, such that the downstream channels are fully interoperable with DOCSIS™-compliant, legacy cable modems.

Bonded flows and non-bonded flows can be distinguished by a program identifier (PID) field. To produce the bonded flows, a bonding group can be defined to bond a set of downstream channels. The packets for each bonding group can be classified into individual channel queues at or near a motion picture expert group (MPEG) level or a packet level. To mitigate congestion and multiplexing inefficiencies, the dispersion mechanism collects real-time information on null frames in each of the channels to determine which channel receives the bonded packets.

The dispersion mechanism includes a queue manager and a priority manager. The queue manager dynamically creates packet queues and allocates memory for each queue. The queue manager also directs the DOCSIS™ protocol processing for each queue. The priority manager interfaces with a plurality of MPEG encapsulation engines to spool the appropriate bytes to the MPEG encapsulation engines for the appropriate outgoing modulator.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

This specification discloses one or more embodiments that incorporate features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
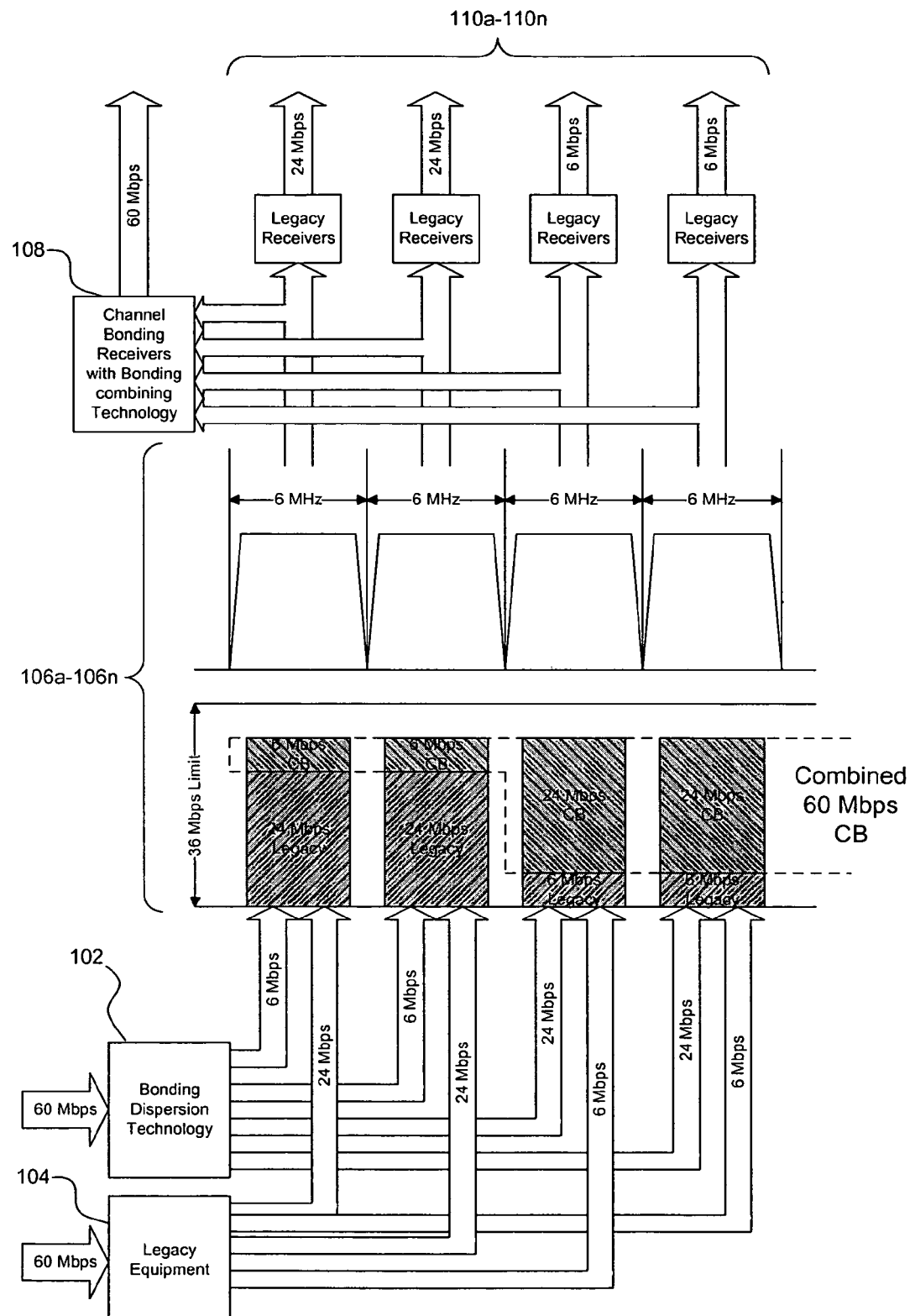
FIG. 1 illustrates a communications system, including bonding and legacy subsystems.

In a communications system (such as a cable communications system), channel bonding can be implemented to achieve the effective performance of a wide band channel, while preserving interoperability with legacy equipment. FIG. 1 illustrates a communications system 100 that includes a bonding dispersion subsystem 102 and a legacy dispersion subsystem 104, which collectively allow the interoperability of channel bonding and legacy communications over a plurality of downstream channels 106a-106n. Legacy dispersion subsystem 104 allows communications with one or more legacy receivers 110a-110n by transmitting flows over a single channel to each receiver 110a-110n. Bonding dispersion subsystem 102 allows communications with one or more channel bonding receivers 108 by bonding multiple downstream channels 106a-106n into a "wider channel."

The quantity of legacy receivers 110a-110n and channel bonding receivers 108 can vary as determined by the system architect. The quantity depicted in FIG. 1 and described herein is provided for illustrative purposes. More or less legacy receivers 110a-110n and channel bonding receivers 108 can be implemented For illustrative purposes, each channel 106a-106n is a standard North American six mega-Hertz (MHz) channel. For example, channel 106a-106b can be produced from four adjacent, six mega-Hertz (MHz) carriers, each of which taken individually is a completely DOCSIS™ 2.0 compliant downstream. The DOCSIS™ 2.0 standard is defined by the CableLabs® Certified™ Cable Modem project (formerly known as Data Over Cable Service Interface Specification (DOCSIS™), which specifies the interface requirements for cable communications systems. It should be understood that channel bonding, as implemented in communications system 100, is not limited to North American channels, nor is it limited to bonding four channels. The quantity of channels and the channel specifications can vary as determined by the system architect. For example, a plurality of eight MHz channels can be included to conform with European standards.

Communications system 100 can be implemented in any multimedia distribution network. Furthermore, it should be understood that the method and system of the present invention can manage the exchange of voice, data, video, audio, messaging, graphics, other forms of media and/or multimedia, or any combination thereof.

Communications system 100 can include a supervisory communications node that is centrally positioned to command and control interactions with and among a plurality of widely distributed remote communications nodes. The supervisory communications node can be a component of a head-end controller for a cable communications network. As such, the supervisory communication node is a CMTS or a part thereof. Bonding dispersion subsystem 102 and legacy dispersion subsystem 104 can be part of such supervisory communications node or CMTS.

Similarly, legacy receivers 110a-110n and bonding receiver 108 can be the remote communications nodes or a part thereof. In an embodiment, at least one of the remote communications nodes is a cable modem or a part thereof. In another embodiment, the supervisory communications node is a CMTS and at least one remote communications node is part of a television set-top box. As part of a cable modem, the remote communications node is configurable to transport one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), and/or the like.

As discussed above, communications system 100 integrates the interoperation of legacy and channel bonding communications over the same downstream channels 106a-106n. Legacy dispersion subsystem 104 receives a stream that is designated for transmission to one or more legacy receivers 110a-110n. Bonding dispersion subsystem 102 receives and disperses a stream across downstream channels 106a-106n to one or more channel bonding receivers 108 (such as a cable modem). Each channel bonding receiver 108 is capable of simultaneously receiving multiple channels 106a-106n and recombining the bits back into the original stream.

Channel bonding receiver 108 interoperates with existing legacy receivers 110a-110n. As shown, a one hundred, twenty (120) Mbps stream is received by bonding dispersion subsystem 102 and legacy dispersion subsystem 104. The traffic is evenly split for bonding dispersion subsystem 102 and legacy dispersion subsystem 104. Accordingly, bonding dispersion subsystem 102 loads the downstream channels 106a-106n with a combined sixty (60) Mbps. Bonding dispersion subsystem 102 balances its load across the four downstream channels 106a-106n with six (6) Mbps, six (6) Mbps, twenty-four (24) Mbps, and twenty-four (24) Mbps, respectively. The bits are transferred across downstream channels 106a-106n, and are received by channel bonding receiver 108 that simultaneously receives the multiple channels 106a-106n. Channel bonding receiver 108 recombines the bits back into the original sixty Mbps stream dispersed by bonding dispersion subsystem 102.

Legacy dispersion subsystem 104 also consumes a portion of each channel 106a-106n. Legacy dispersion subsystem 104 loads the four downstream channels 106a-106n with twenty-four (24) Mbps, twenty-four (24) Mbps, six (6) Mbps, and six (6) Mbps, respectively. Therefore, no single downstream channel 106a-106n is filled with a legacy or a bonded stream. Channel bonding information and legacy information are both flowing on the same downstream channels 106a-106n simultaneously. As such, the six MHz infrastructure of communications system 100 is being leveraged for both types of flows (i.e., channel bonding and legacy).

As discussed above, the channel specifications can vary as determined by the system architect. It should be understood that, when the downstream channels 106a-106n are bonded (referred to as "bonded channels 106a-106n"), they are not required to have the same amount of spectrum. Additionally, there is no requirement that the modulation orders of the bonded channels 106a-106n to be the same. The bonded channels 106a-106n are not required to be contiguous.

With both channel bonding information and legacy information on the same downstream channel 106a-106n, the channel bonding information must be in a format that will not disturb the legacy receivers 110a-110n. Thus, backward compatibility and interoperability is a requirement for channel bonding implementations. Channel bonding receiver 108 also has the ability to operate in an environment with legacy information.

Channel bonding leverages load balancing techniques. A significant advantage that channel bonding has over conventional load balancing techniques applied in cable systems, such as communications system 100, is that a receiver (e.g., channel bonding receiver 108) in a channel bonding system can receive multiple channels simultaneously. Conventional load balancing solutions must move single channel receivers from one channel to another to prevent any given channel from overloading. There is a performance hit in the process of moving receivers across channels. In a channel bonded system (e.g., communications system 100), the receiver is already receiving on multiple channels, so the transmitter only needs to balance the flows across the channels. In other words, no channel hopping is required. Channel bonding provides the effective bandwidth and statistical multiplexing advantages of a wide band channel.

The ability of a channel bonding customer premises equipment (CPE) device (e.g., channel bonding receiver 108) to coexist and interoperate on the same cable plant, sharing the same spectrum, with legacy devices (e.g., legacy receivers 110a-110n) allows an multiple service operator (MSO) to roll out channel bonding CPE devices gradually. An MSO would not be required to overhaul all of the CPE devices to start to take advantage of channel bonding.

Figure 2:
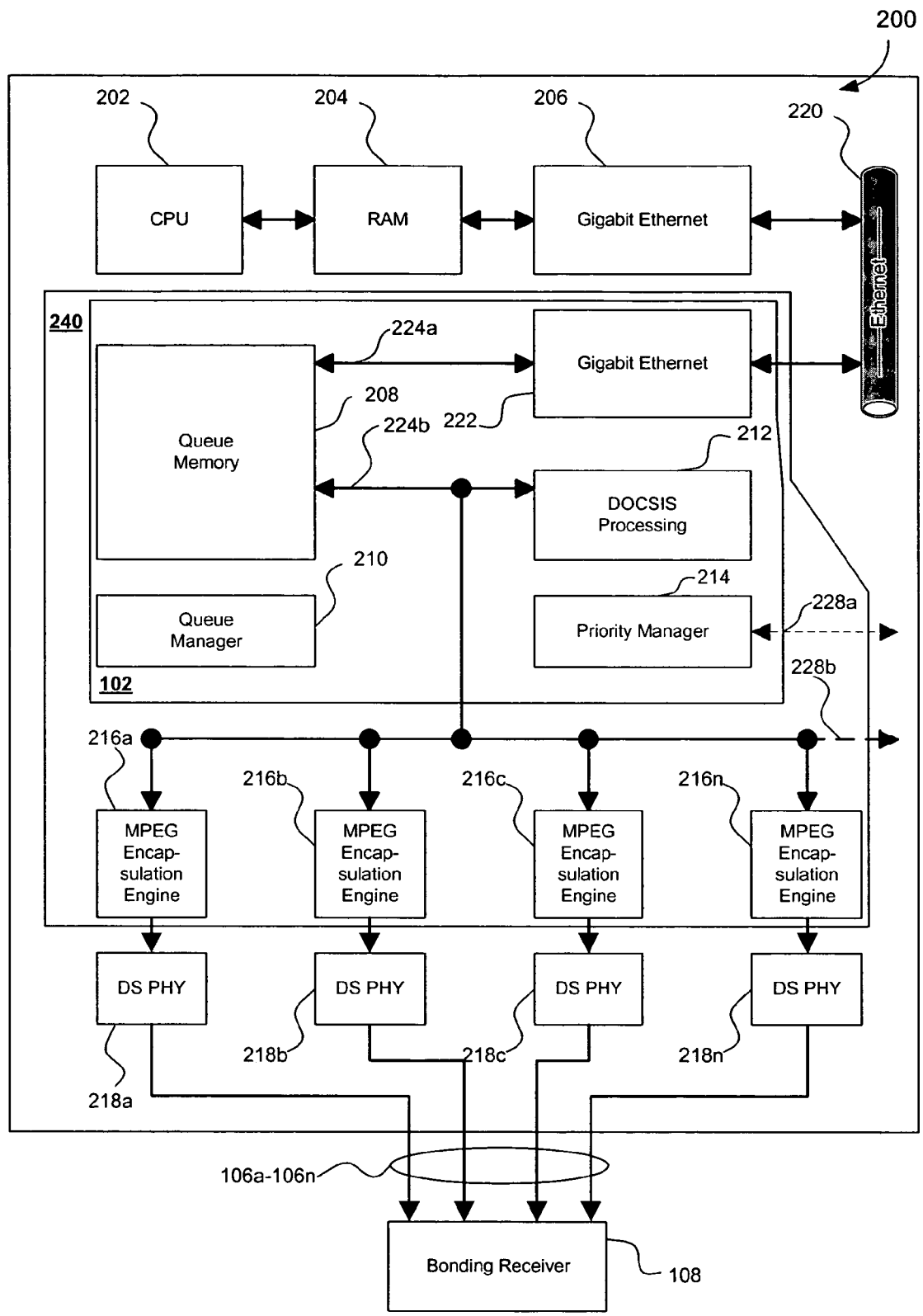
FIG. 2 illustrates a supervisory communications node configured to implement channel bonding.

FIG. 2 illustrates a supervisory communications node 200 that is configured to implement channel bonding. Supervisory communications node 200 includes a CPU 202, RAM 204, media access controller (MAC) 240, and a plurality of downstream physical interface layer modulators (DS PHY) 218a-218n for transmitting flows over downstream channels 106a-106n. As discussed above, four downstream channels 106a-106n are described herein for illustrative purposes. The four DS PHY 218a-218n are depicted in FIG. 2 to produce the four downstream channels 106a-106n. DS PHY 218a-218n convert a packet from MAC 240 into analog form and modulate it onto a carrier signal in accordance with a Quadrature Amplitude Modulation (QAM) technique. However other modulation standards can be used, including but not limited to a Quadrature Phase Shift Key (QPSK) technique.

MAC 240 is a quad downstream MAC with four encapsulation engines 216a-216n. Each encapsulation engine 216a-216n is dedicated to a single DS PHY 218a-218n, and hence, a single downstream channel 106a-106n. Encapsulation engines 216a-216n formats the downstream with a motion picture expert group (MPEG) transmission convergence sublayer. However, the present invention can be configured to support other data formats as would be apparent to one skilled in the relevant art(s).

MAC 240 also includes bonding dispersion subsystem 102, which enables multiple paths to be created for flows, both bonded flows and non-bonded flows. To support bonded flows, bonding groups are created. Each bonding group is defined to bond a set of QAM downstream channels 106a-106n. Any combination of two or more the downstream channels 106a-106n can represent a bonding group.

Each bonding group is assigned a unique identifier. For example, during an MPEG framing process, an encapsulation engine 216a-216n produces a MPEG transport/encapsulation header that includes a program identifier (PID) field. The PID field is defined in the DOCSIS™ 1.1 and 2.0 specifications as being "0x1FFF" to designate a legacy packet (i.e., a non-bonded flow). If the thirteen-bit PID field is denoted as any value other than "0x1FFF", a DOCSIS™ 1.1 and 2.0 cable modem (i.e., legacy receivers 110a-110n) is required to silently discard the packet. As such, a "0x1FFF" designation in the PID field of an encapsulation header is used to mark a packet as being a non-bonded flow. Any other designation in the PID field is used to mark a packet as belonging to a bonded group. A distinct PID can be created and associated with each bonding group. The use of the PID field in the MPEG frame provides multiple simultaneous bonding groups and interoperability with legacy communications.

Flows for the downstream enter supervisory communications node 200 via a Gigabit Ethernet port 206. The flows are placed in RAM 202. CPU 202 applies classification to the flows and directs them to a queue memory 208 via a Gigabit Ethernet port 222. Queue memory 208 and Gigabit Ethernet port 222 are components of bonding dispersion subsystem 102. Bonding dispersion subsystem 102 also includes a queue manager 210, a protocol processor 212, and a priority manager 214.

As discussed, CPU 202 classifies and directs the flows to an input queue within queue memory 208. Queue memory 208 does not include explicit input queues. Queue memory 208 is configurable to provide a variable number of queues, which increases or decreases with the system requirements. Queue manager 210 defines the quantity of queues that are held in queue memory 208, and defines the memory capacity of each queue. Queue manager 210 also directs protocol processor 212 to pull the appropriate packets out of the input queues.

Protocol processor 212 performs protocol processing on the downstream flows. Protocol processing includes payload header suppression (PHS), data encryption standard (DES) encryption, baseline privacy interface (BPI), and/or the like. In an embodiment, the protocol processing complies with the requirements of the DOCSIS™ 2.0 protocol, which includes the creation of a "regular" DOCSIS™ header with extended headers (EHDRs), header checksum (HCS), and/or the like. Once the protocol processing is completed, queue manager 210 directs the resulting packets into an appropriate post-protocol processing queue held in Queue memory 208.

Priority manager 214 interfaces with the encapsulation engines 216a-216n, and spools the appropriate bytes from the post-protocol processing queue(s) to the appropriate encapsulation engine(s) 216a-216n. As discussed above, the encapsulation engines 216a-216n frames the flow into MPEG frames and applies the appropriate PID to identify the appropriate bonding group, or identify the frames as belonging to a non-bonded flow. If PID specifies a bonding group, the encapsulation engine 216a-216n can also inserts a bonding sequence number that provides instructions to the bonding receiver 108 for reassembling the bonded flow into the original packet.

A port (shown as ports 228a-228b) is coupled to priority manager 214 and the data bus communicating with encapsulation engines 216a-216n. Ports 228a-228b provide both the data and control paths required to bond across multiple components. Sequence numbers are assigned to designate each encapsulation engine 216a-216n.

In FIG. 2, queue memory 208 is drawn with two buses 224a-224b. This dual bus structure enables the processing to run at four times a single downstream rate. Therefore, the dual buses 224a-224b are required to handle this throughput.

As discussed, communications system 100 integrates the interoperation of legacy and channel bonding communications. In an embodiment, CPU 202 classifies the flows and directs bonded flows to bonding dispersion subsystem 102 (as described above with reference to FIG. 2). Non-bonded flows are directed to legacy dispersion subsystem 104, which processes and sends the legacy packets over a single downstream channel 106a-106n to legacy receivers 110a-110n.

However, in another embodiment, bonding dispersion subsystem 102 and legacy dispersion subsystem 104 can be integrated with MAC 240, such that the bonding circuitry of bonding dispersion subsystem 102 is hidden with the circuitry of legacy dispersion subsystem 104. As such, CPU classifies and denotes the flows as being bonded or non-bonded. When the flows are directed to an input queue within queue memory 208, the flows are stored with information that identifies the flows as being bonded or non-bonded.

Extra queues, as required, are dynamically created by queue manager 210 and stored in the queue memory 208. Based on the flow classification (bonded or non-bonded), priority manager 214 directs the post-protocol processed packets to the appropriate encapsulation engine 216a-216n for the outgoing DS PHY 218a-218n. Based on the flow classification, the encapsulation engine 216a-216n dynamically places the appropriate PID (and sequence number, if appropriate) to the outgoing MPEG frame. Hence, MAC 240 is configurable to process downstream flows to enable legacy DOCSIS traffic and/or bonded traffic headed to be carried over the same the same downstream channels 116a-116n.

Figure 3:
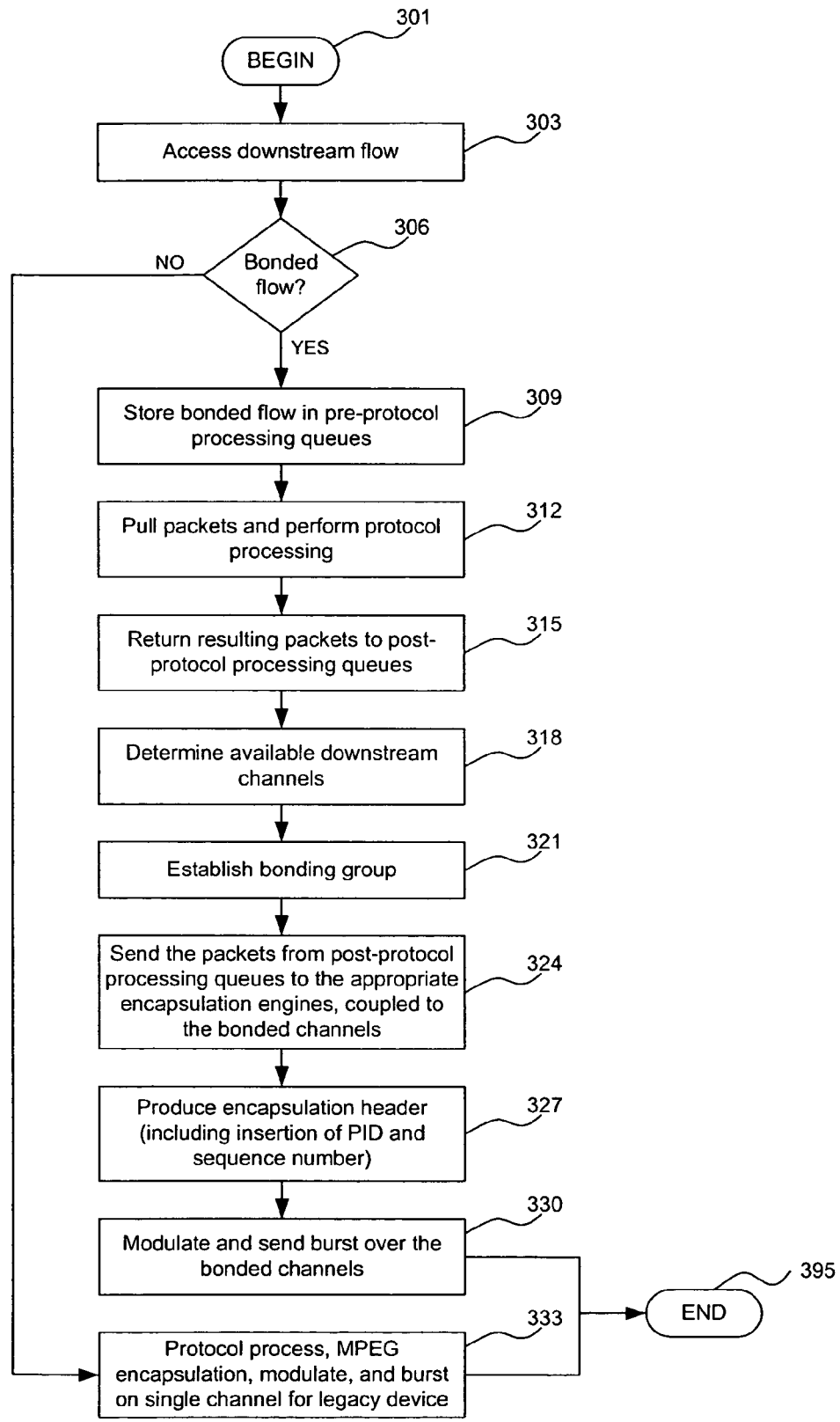
FIG. 3 illustrates downstream channel bonding.

Referring to FIG. 3, flowchart 300 shows an example of a control flow for downstream channel bonding. The control flow of flowchart 300 disperses the flow at the MPEG level. The control flow begins at step 301 and passes immediately to step 303. At step 303, a service flow is received for the downstream. As discussed with reference to FIG. 2, a software application residing on CPU 202 can classify the service flow as being a bonded or non-bonded flow. Afterwards, the flow is directed to a media access controller (such as MAC 240) for further processing.

Referring back to FIG. 3 at step 306, the flow classification (i.e., bonded or non-bonded) is detected. The control flow passes to step 309 if a bonded flow is detected. Otherwise, the control flow passes to step 333.

At step 309, the flow is stored in a pre-protocol processing queue. A queue manager (such as, queue manager 210) can dynamically create flexible queues and establish capacity sizes for each queue. The queues reside in a queue memory, such as queue memory 208.

At step 312, bytes are pulled from the pre-protocol processing queues for protocol processing. As discussed above, protocol processing includes PHS, DES encryption, BPI, and/or the like.

At step 315, the resulting packets are returned to a post-protocol processing queue(s) within the queue memory (such as queue memory 208).

At step 318, the availability of the downstream channels 106a-106n is determined. As discussed above, a bonding group can be established to identify the downstream channels 106a-106n that will carry a bonded flow. The bonded group can be determined by a software application (e.g., via CPU 202), and the bonding group information can be stored with the flow in the queue memory (e.g., queue memory 208). A priority manager (such as, priority manager 214) can utilize the bonding group information to spool the appropriate bytes from the post-protocol processing queue(s) to the appropriate encapsulation engine(s) 216a-216n that correspond to the downstream channels 106a-106n defining the bonding group. Alternatively, the priority manager can determine which channels to bond together independent of bonding group information from CPU 202.

In an embodiment, priority manager 214 communicates with the encapsulation engines 216a-216n to verify the availability the downstream channels 106a-106n defining the specified bonding group. If one or more of the encapsulation engines 216a-216n are not available, or otherwise congested, priority manager 214 can dynamically direct the flow to the available encapsulation engine(s) 216a-216n. Therefore, priority manager 214 can define a bonding group, in real or near time, by using, for example, information on null frames in each of the downstream channels 106a-106n. Priority manager 214 can also redefine a bonding group previously established by CPU 202, if an encapsulation engine 216a-216n or downstream channel 106a-106n becomes delayed or unavailable. As such, priority manager 214 provides automatic congestion control for the downstream channels 106a-106n.

Thus referring back to FIG. 3, after the downstream channels 106a-106n have been determined to be available (or after identifying the available downstream channels 106a-106n), the bonding group is established or confirmed at step 321. At step 324, the appropriate bytes are spooled from the post-protocol processing queue(s) to an appropriate encapsulation engine(s) (such as encapsulation engines 216a-216n) that correspond to the bonded downstream channels 106a-106n.

At step 327, the flow is framed into MPEG frames that include an appropriate PID to identify the bonding group. A bonding sequence number can also be included to provide instructions to the downstream receiver (e.g., bonding receiver 108) for reassembling the bonded flow into the original packet.

At step 330, a burst of MPEG framed packets modulated and sent over the bonded downstream channels to the designated bonding receiver(s) 108.

Referring back to step 306 if a non-bonded or legacy flow is detected, the control flow passes to step 333. At step 333, the legacy flow is protocol processed, MPEG encapsulated, modulated, and carried over a single downstream channel 106a-106n to legacy receivers 110a-110n. After the bonded flow or non-bonded flow has been transmitted at step 330 or step 333, respectively, the control flow ends as indicated at step 395.

Thus, the control flow in FIG. 3 describes that channel bonding can occur at the MPEG level. Channel bonding can also be implemented at the packet level, instead of the MPEG level. As such, whole packets are dispersed onto each modulator (e.g., DS PHY 218-218n). This allows a DOCSIS extended header to contain bonding group and sequence information.

To implement packet level bonding, the bonding groups are defined and the downstream channels 106a-106n are bonded by the CPU 202. CPU 202 places the packet into the appropriate downstream channel 106a-106n. As the packets are queued in queue memory 208, CPU 202 provides the additional bonding information so that protocol processor 212 can create the appropriate bonding header during protocol processing.

After the packet is protocol processed and wrapped with a DOCSIS header, the packet is stored in a high, low queue within queue memory 208. The packet with the highest priority moves into the appropriate encapsulation engine 216a-216n and onto the DS PHY 218a-218n, as determined by the CPU 202.

For packet level bonding, CPU 202 maintains an accurate and fairly fine representation of the loading of each encapsulation engine 216a-216n and DS PHY 218a-218n. CPU 202 decides which modulator (e.g., DS PHY 218a-218n) is selected. If CPU 202 loads up a modulator, if a modulator gets held up with higher priority traffic, the bonding jitter is increased as the CPE (e.g., bonding receiver 108) has to store the packets received from the other bonded modulators (e.g., DS PHY 218a-218n). This demands that CPU 202 protect the system from loading up a modulator (e.g., DS PHY 218a-218n).

CPU 202 can coarsely rate shape the traffic onto a modulator (e.g., DS PHY 218a-218n). The coarse rate shaper would overdrive the modulator (e.g., DS PHY 218a-218n), and leverage the queuing between CPU 202 and the modulator (e.g., DS PHY 218a-218n). However, CPU 202 must reduce the threshold for the rate shaper to prevent this from happening to a single modulator (e.g., DS PHY 218a-218n). Another alternative would be to implement a finer rate shaper.

Referring back to FIG. 3, flowchart 300 describes modulation selection being performed at the MPEG level. Thus, if a modulator (e.g., DS PHY 218a-218n) gets loaded, then rather than hold an MPEG frame waiting on the overloaded modulator (e.g., DS PHY 218a-218n), priority manager 214 would place the MPEG frame on another one of the bonded modulators (e.g., DS PHY 218a-218n). As described above, this creates an automatic congestion control mechanism without taxing the CPU 202.

In embodiments where modulation selection is performed at the packet level, CPU 202 places packets in queues destined for a specific modulator (e.g., DS PHY 218a-218n). CPU 202 is not able to implement the automatic congestion control. However, the priority manager 214 can be utilized to provide automatic congest control. As such, CPU 202 can place the information for the desired modulator (e.g., DS PHY 218a-218n) in queue memory 208. In normal mode, the packets are sent to the appropriate queue as dictated by CPU 202. In congestion mode, the desired queue field is ignored and the packets are sent to the first modulator (e.g., DS PHY 218a-218n) of the available bonded modulators (e.g., DS PHY 218a-218n). Thus, priority manager 214 searches all queues (within queue memory 208) of a bonded group to find the next outgoing packet and route it to the first available channel (i.e., encapsulation engine 216a-216n).

FIGS. 1-3 are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention is implemented using software, the software can be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention could be implemented in any multi-nodal communications environment governed by centralized nodes. The nodes include, but are not limited to, cable modems, set-top boxes, and head-ends, as well as communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. A method of bonding a plurality of downstream channels in a communications device, comprising the steps of:

storing a downstream flow in a queue memory having a variable quantity of queues, the queues including at least one pre-protocol processing queue that holds elements from the downstream flow prior to protocol processing and at least one post-protocol processing queue that holds elements from the downstream flow following protocol processing;

performing protocol processing on elements pulled from the at least one pre-protocol processing queue;

storing resulting packets from the protocol processing into the at least one post-protocol processing queue;

receiving real time information on null frames in a plurality of downstream channels to detect two or more available downstream channels to form a bonded group of downstream channels;

forwarding bytes from the at least one post-protocol processing queue to two or more designated encapsulation engines that are each respectively coupled to a modulator for one of the plurality of downstream channels that are members of the bonded group of downstream channels; and sending a burst from the modulator to a designated bonding receiver.

2. The method according to claim 1, further comprising:

dynamically altering a capacity size of one or more of the queues.

3. The method according to claim 1, wherein said detecting comprises:

detecting an initial bonded group of downstream channels established by a software application prior to protocol processing; and forming the bonded group of downstream channels using the initial bonded group of downstream channels when the initial bonded group of downstream channels are determined to be available.

4. The method according to claim 3, wherein said detecting further comprises:

determining that a downstream channel from the initial bonded group of downstream channels is unavailable;

detecting another available downstream channel as a substitute channel for the unavailable channel; and forming the bonded group of downstream channels to include the substitute channel and the available channels from the initial bonded group of downstream channels.

5. The method according to claim 1, further comprising:

appending an identifier field in an encapsulation header to identify the bonding group.

6. The method according to claim 1, further comprising:

appending a sequence number in an encapsulation header to identify the sequence for reassembling the bytes upon receipt at the designated bonding receiver.

7. A system for bonding a plurality of downstream channels associated with a communications device, comprising:

a queue memory configured to store elements of a downstream flow;

a queue manager configured to dynamically create a variable quantity of queues within the queue memory, wherein the queues include at least one pre-protocol processing queue that holds elements from the downstream flow prior to protocol processing and at least one post-protocol processing queue that holds elements from the downstream flow following protocol processing;

a protocol processor configured to perform protocol processing on elements pulled from the queues; and a priority manager configured to receive real time information on null frames in a plurality of downstream channels to detect two or more available channels to form a bonded group of downstream channels, wherein the priority manager forwards bytes from the at least one post-protocol processing queue to two or more designated encapsulation engines that are each respectively coupled to a modulator for one of the plurality of downstream channels that are members of the bonded group of downstream channels.

8. The system of claim 7, wherein the queue manager is configured to dynamically alter a capacity size of one or more of the queues.

9. The system of claim 7, wherein the protocol processor is further configured to receive a control signal from the queue manager to pull elements out of the at least one pre-protocol processing queue to perform the protocol processing.

10. The system of claim 7, wherein the protocol processor is further configured to store the resulting packets from the protocol processing into the at least one post-protocol processing queue.

11. The system of claim 7, wherein the priority manager spools bytes to a designated encapsulation engine communicatively coupled to a modulator for a downstream channel that is a member of the bonded group of downstream channels.

12. The system of claim 7, wherein the designated encapsulation engine dynamically places an identifier to the outgoing frame to identify the bonded group of downstream channels.

13. The system of claim 7, wherein the designated encapsulation engine dynamically places a sequence number to the outgoing frame to identify the sequence for reassembling the downstream flow upon receipt at a designated bonding receiver.

* * * * *